(12) United States Patent
Stählin

(10) Patent No.: US 10,928,522 B2
(45) Date of Patent: Feb. 23, 2021

(54) METHOD AND DEVICE FOR DETERMINING NAVIGATION INFORMATION

(71) Applicant: Continental Teves AG & Co. oHG, Frankfurt am Main (DE)

(72) Inventor: Ulrich Stählin, Rochester, MI (US)

(73) Assignee: Continental Teves AG & Co. oHG

( * ) Notice: Subject to any disclaimer, the term of this patent is extended or adjusted under 35 U.S.C. 154(b) by 0 days.

(21) Appl. No.: 16/223,241

(22) Filed: Dec. 18, 2018

(65) Prior Publication Data

US 2020/0191978 A1    Jun. 18, 2020

(51) Int. Cl.
| | |
|---|---|
| *G01S 19/40* | (2010.01) |
| *G01S 19/43* | (2010.01) |
| *G01S 19/49* | (2010.01) |
| *G01S 19/17* | (2010.01) |

(52) U.S. Cl.
CPC .............. *G01S 19/40* (2013.01); *G01S 19/17* (2013.01); *G01S 19/43* (2013.01); *G01S 19/49* (2013.01)

(58) Field of Classification Search
CPC .......... G01S 19/40; G01S 19/17; G01S 19/43; G01S 19/49

See application file for complete search history.

(56) References Cited

U.S. PATENT DOCUMENTS

| | | | | |
|---|---|---|---|---|
| 9,622,062 | B1 * | 4/2017 | Lin | ........................ H04B 1/3822 |
| 2010/0267379 | A1 * | 10/2010 | Stahlin | ............. G08G 1/096716 |
| | | | | 455/426.1 |
| 2011/0098877 | A1 * | 4/2011 | Stahlin | .................... G08G 1/161 |
| | | | | 701/31.4 |
| 2011/0224901 | A1 * | 9/2011 | Aben | ...................... G01C 21/32 |
| | | | | 701/532 |
| 2012/0053888 | A1 * | 3/2012 | Stahlin | .................... G01S 5/021 |
| | | | | 702/150 |
| 2013/0116908 | A1 * | 5/2013 | Oh | ........................ G05D 1/0278 |
| | | | | 701/96 |
| 2015/0222378 | A1 * | 8/2015 | Stahlin | ................. G08G 1/0112 |
| | | | | 370/324 |
| 2016/0036519 | A1 * | 2/2016 | Loomis | ..................... H04B 7/22 |
| | | | | 370/316 |
| 2016/0282473 | A1 * | 9/2016 | Driscoll | ................... G01S 19/49 |
| 2017/0268896 | A1 * | 9/2017 | Bai | .......................... G01O 21/36 |
| 2018/0052005 | A1 * | 2/2018 | Schilling | ................ G08G 1/166 |
| 2018/0095177 | A1 * | 4/2018 | Peake | ....................... G01S 19/05 |
| 2018/0301033 | A1 * | 10/2018 | Oshida | ................. G08G 1/0116 |
| 2019/0196022 | A1 * | 6/2019 | Rezaei | ..................... G01S 19/07 |
| 2019/0294167 | A1 * | 9/2019 | Kutila | .................. G05D 1/0231 |
| 2019/0317600 | A1 * | 10/2019 | White | ....................... G06F 3/013 |
| 2020/0042013 | A1 * | 2/2020 | Kelkar | ..................... H04W 4/40 |
| 2020/0234574 | A1 * | 7/2020 | Park | ...................... G08G 1/0133 |

FOREIGN PATENT DOCUMENTS

CN            106646539 A   *   5/2017

* cited by examiner

*Primary Examiner* — Rodney A Butler

(74) *Attorney, Agent, or Firm* — RatnerPrestia

(57) ABSTRACT

A method for determining navigation information of a second road user using a computing unit of a first road user, wherein the first road user receives navigation information of the second road user, wherein the computing unit of the first road user corrects the received navigation information using correction information, wherein the correction information corresponding to a position of the second road user is obtained from a digital map. A corresponding device and to use thereof in a vehicle is also disclosed.

13 Claims, 3 Drawing Sheets

METHOD AND DEVICE FOR DETERMINING NAVIGATION INFORMATION

FIELD OF THE INVENTION

The invention relates to a method for determining navigation information. The invention further relates to a corresponding device.

BACKGROUND OF THE INVENTION

Vehicle-to-X communication is currently moving towards series production. It in particular provides vehicles with the possibility of emitting vehicle-to-X messages, at given distances or indeed in the event of certain incidents, which messages for example include information about speed, position, route, acceleration or particular incidents such as breakdowns or emergency braking maneuvers, for example. The currently applicable standards are IEEE802.11(p), IEEE1609, SAE 2735, SAE 2945 and ETSI ITS-G5. New 3GPP standards for Cellular-V2X (C-V2X) are also currently being drawn up.

Using vehicle-to-X communication, it is possible on the basis of transmitted position information inter alia to determine a relative position of a further road user with regard to an ego position. Before the emitting road user emits position information, the position determined by means of the global navigation satellite system (GNSS) is often enhanced in accuracy using dead reckoning, in particular in the event of comparatively poor prevailing global navigation satellite system reception conditions. Information from further sensors is in this case conventionally used for dead reckoning and merged with the GNSS information.

A receiver of a vehicle-to-X message which contains position information obtained in such a manner does not conventionally have or receive any information about the underlying calculation methods for carrying out dead reckoning and thus also not about the extent to which the message matches the receiver's basis for calculation. Comparatively simple calculation methods, in particular, are oriented to a greater extent towards positions acquired by means of GNSS, wherein portions between said positions are completed by information which has been linearly extrapolated or determined by means of vehicle dynamics sensors. Errors or deviations in the determined GNSS position therefore have a direct impact on the position information to be emitted, as a result of which position acquisition of the emitting road user by a receiving road user is more highly error-prone during calculation. This deviation of the determined position from the actual position of the second road user relative to the first road user can lead to safety-critical traffic situations, for example if an impending collision is not recognized or is recognized too late or false alarms are output to a vehicle driver.

SUMMARY OF THE INVENTION

An aspect of the invention is a method by means of which an improved determination by a first road user of navigation information of a second road user can take place. A further aspect of the invention is a corresponding device which is configured to perform such a method.

An aspect of the invention describes a method for determining navigation information of a second road user using a computing unit of a first road user, wherein the first road user receives navigation information of the second road user by means of a vehicle-to-X communication device and the computing unit of the first road user corrects the received navigation information using correction information. The correction information is here obtained from a digital map corresponding to a position of the second road user. According to one embodiment, the navigation information is transmitted by means of vehicle-to-X communication, in particular using at least one vehicle-to-X message from the second to the first road user.

Before navigation information, for example position information, is emitted, methods for improving the accuracy thereof have frequently already been carried out, for example by means of dead reckoning. These methods are conventionally based on GNSS signals acquired by means of a GNSS receiver which, in a simple implementation, are in principle assumed to be correct and spatial regions between the discrete acquisition events are linearly extrapolated to connect the acquired values. If these signals or the navigation information substantially directly determined therefrom deviate from the actual, but unknown value, dead reckoning based thereon can likewise deviate considerably from the actual value.

The concept now underlying an aspect of the invention is to make use of local correction information stored in a digital map to determine navigation information of a second road user.

In principle, any information which is usable, appropriate and storable for characterizing a specific position can be considered for use as correction information. Navigation information is for example position information for describing a position, speed information for describing a speed, rotation information for describing a direction of movement and/or trajectory information for describing a carried out or planned motion path of the second road user.

One advantage which arises from the above is that systematic errors which arise from different procedures for calculating navigation information of a first and second road user can be avoided. This in particular also applies if a relevant standard is fulfilled by the different calculation methods. A further advantage is that implementing the method in existing systems involves little effort and consequently low additional costs.

Road users should in principle be taken to mean participants in traffic, such as for example vehicles, cyclists or people. A vehicle can here be a motor vehicle, in particular a passenger vehicle, a truck, a motorcycle, an electric vehicle or a hybrid vehicle, a watercraft or an aircraft.

According to one embodiment, the digital map which comprises the correction information is stored at least in part in a data memory which is carried or comprised by the first road user. Accordingly, the correction information is obtained from the data memory of the first road user by the first road user or by a computing unit carried or comprised by said road user. According to a complementary or alternative embodiment, the digital map which comprises the correction information is at least in part stored in a data memory of a central server which is not comprised by the first road user. Accordingly, the correction information can be obtained complementarily or alternatively from the data memory of the central server by the first road user or by a computing unit carried or comprised by said road user.

According to a further development, the correction information is determined and/or stored by means of the computing unit of the first road user. This includes storage of determined correction information by the computing unit of the first road user in a data memory of the first road user and/or a data memory of a central server. The correction information is here conveniently determined and stored by the computing unit of the first road user prior to its being used for correction of the navigation information. The correction information can in principle be stored using any database which models road topologies, wherein it is not a necessary prerequisite for it to be possible to generate road topology in terms of learning, providing that the correction information is addable.

According to one embodiment, determination and/or storage of the correction information in the digital map by the computing unit of the first road user is initiated by acquisition of a GNSS signal or of a position on the basis of a GNSS signal. Advantageously, local correction information relative to a respective acquired position is thus continuously determined or stored, in particular during ongoing operation of an underlying device which can be associated with a road user. This determined and/or stored correction information can be further used in accordance with the proposed method for determining navigation information of a second road user.

According to one embodiment, the digital map is a self-learning map, in particular a RoadGraph map and/or a dynamic electronic horizon. According to a further development, the self-learning map accordingly comprises, in addition to the correction information, data points of a recognized route. The data points in particular describe position data which can serve in this form to reproduce a route. The data points can furthermore comprise further metadata. The map can be compiled or updated in particular based on position data of the first road user itself and/or on the basis of data from other road users, for example. Such position data are typically determined by position determination methods, such as satellite navigation or triangulation in mobile radio networks. It can here typically be assumed that a road or traffic-accessible route will also be located at a position where a vehicle is located. Such traffic-accessible routes which were hitherto unknown to the self-learning map can be identified by combining corresponding position data, for example in the form of an "ant trail". Modified courses can likewise be determined. This allows the self-learning map to be updated in real time.

According to one embodiment, the correction information describes a deviation between navigation information obtained by means of a GNSS receiver and accuracy-enhanced navigation information, wherein the accuracy-enhanced navigation information is determined by means of dead reckoning, in particular using the navigation information obtained by means of a GNSS receiver and sensor information obtained by means of at least one sensor. The navigation information determined by means of the GNSS receiver is here based on received raw satellite data and can in particular be identified by a computing unit comprised by the GNSS receiver using this raw satellite data. The accuracy-enhanced navigation information is for example the result of merging the navigation information obtained by means of a GNSS receiver with sensor information obtained by means of at least one sensor. Merging takes place, for example, using a variant of a Kalman filter.

According to a further development, the correction information describes a deviation between a position, speed, rotation, trajectory and/or variance metric which were determined by means of a GNSS receiver and by means of sensor information of at least one sensor, and a position, speed, rotation, trajectory and/or variance metric determined by means of the GNSS receiver and without sensor information from at least one sensor. For example, the correction information describes a deviation between a position which is determined solely using position information from the GNSS receiver and a position which is determined using position information from the GNSS receiver and sensor information from at least one sensor. According to at least one alternative or complementary embodiment, the navigation information determined by the GNSS receiver reproduces a speed, rotation or route, trajectory and/or a variance metric, such as for example an error metric or a standard deviation, for example of the position and/or speed. If a further development provides that the accuracy-enhanced navigation information reproduces an accuracy-enhanced speed, rotation or route, trajectory and/or a variance metric, the correction information alternatively or complementarily describes a deviation between the speed, rotation or route, trajectory and/or variance metric determined by means of the GNSS receiver and the respectively associated accuracy-enhanced values.

A further development can provide that the correction information reproduces a variance metric of navigation information acquired by means of a GNSS receiver and navigation information based on dead reckoning, wherein the navigation information is in particular obtained on the basis of dead reckoning by merging navigation information acquired by means of a GNSS receiver and sensor information acquired by means of at least one sensor and/or by means of dead reckoning information provided by the GNSS receiver itself. Furthermore, in particular when a two- or multi-frequency GNSS receiver is being used, it can alternatively or complementarily be provided that the correction information describes a variance metric of navigation information acquired by means of a single frequency of a GNSS receiver.

According to one embodiment, the correction information comprised by the digital map thus describes a deviation for a given position on the digital map which arises between the position determined solely by means of the GNSS receiver and the position determined by means of the GNSS receiver and further sensor information. A position which is identified by means of a GNSS receiver and at least one further sensor is frequently based on a merger of this information in order to improve localization accuracy, wherein acceleration sensors and/or angle-of-rotation sensors are for example used as the further sensors.

Position determination calculations are conventionally performed on the basis of position information provided by a GNSS receiver and appropriately preprocessed by means of a computing unit of the GNSS receiver and only very few implementations calculate the position information on the basis of the raw satellite data itself. The deviation can thus be determined without substantial additional effort.

According to a further development, the first road user only obtains correction information from the digital map which it itself added to the digital map. Precise knowledge about any underlying accuracy enhancement methods used for improving the accuracy of the navigation information is thus advantageously available. Any possibly available correction information which was acquired by other road users and added to the map is accordingly disregarded. Correction information from other road users can, for example, subsequently be added to an update of the digital map. Alternatively or complementarily, only the first road user adds correction information to the digital map. This is in particular the case if the map is stored in a data memory associated with and/or carried by the first road user, for example if the first road user is a vehicle equipped with a corresponding data memory.

According to one embodiment, the first road user determines a calculation quality of the received navigation information. A higher calculation quality of a method which is used conventionally results in improved accuracy, wherein greater effort is frequently required for the acquisition and processing of acquired information. Calculation quality thus at least indirectly reproduces a method for acquiring and optionally improving the navigation information in question and the accuracy of the results achievable therewith. According to a further development, the received navigation information is only corrected using the correction information when the determined calculation quality is less than or equal to a set limit value. According to one exemplary embodiment, correction is only performed if it is established on the basis of the determined calculation quality that the second road user is filling in the spatial regions between successive navigation information acquisition events solely on the basis of GNSS signals and without using sensor information from at least one sensor.

For example, position acquisition by means of GNSS is conventionally discrete, wherein no spatial and temporal information is available between acquisition points. As has already been explained, dead reckoning can be provided to fill in these regions between the discrete acquisition points or for generally improving position and/or movement acquisition. The regions between GNSS acquisition points can for example be filled in by generating a 100 Hz signal from a 10 Hz GNSS signal by extrapolating nine signals based on vehicle dynamics data subsequent to each GNSS acquisition point. Calculation quality as defined above then in particular describes the effort applied by the second road user to determine actual status, for example position or movement.

According to a further development, a position of a further road user received by means of vehicle-to-X communication is corrected using the correction information, and a relative position of the second road user in relation to the first road user is identified. Absolute coordinates of a global navigation satellite system are conventionally transmitted by means of vehicle-to-X communication in order to describe a position. This position represented in absolute coordinates is transformed into a coordinate system of the receiving road user before the relative position of the road users in relation to one another is calculated. Relative position can then be acquired with improved accuracy by the described procedure.

According to one embodiment, vehicle-to-X messages are used for the transmission of the navigation information. A vehicle-to-X message is typically a message which was sent by another road user or an infrastructure unit. This message typically at least contains position data of this other vehicle. In typical implementations of vehicle-to-X communication systems, such messages are exchanged directly between road users, which in particular means that mediation by a mobile radio network or other external infrastructure is not necessary, but can also proceed by means of such. The received vehicle-to-X messages here conveniently comprise information about speed, position, route, acceleration and/or particular incidents, such as for example breakdowns or emergency braking maneuvers, of the road users or infrastructure units which emit the messages. In addition, this information can advantageously also be used for generating or updating the self-learning map.

At least one embodiment of the described method is conveniently performed by means of at least one computing unit of the first road user or the computing unit is configured to perform the method.

An aspect of the invention furthermore relates to a device of a first road user for determining navigation information of a second road user, comprising a computing unit and a vehicle-to-X communication device, wherein the computing unit is designed to correct navigation information received from the second road user by means of the vehicle-to-X communication device using correction information and to obtain the correction information corresponding to a position of the second road user from a digital map.

The digital map can for example be stored on a data memory which can be comprised by the computing unit and/or the device. The device is conveniently designed to communicate with further systems by means of a data transmission means. A vehicle bus system, for example a CAN bus system, can in particular be used for this purpose.

According to a further aspect of the invention, the device is configured to perform a method according to at least one of the described embodiments.

In a further development of the stated device, the stated device has a memory and a processor. In this way, the stated method is saved in the memory in the form of a computer program and the processor is provided to perform the method when the computer program is loaded from the memory into the processor.

According to a further aspect of the invention, a computer program comprises program code means for performing all the steps of one of the stated methods when the computer program is run on a computer or one of the stated devices.

According td a further aspect of the invention, a computer program product contains a program code which is stored on a computer-readable data storage medium and which, when run on a data processing unit, performs one of the stated methods.

An aspect of the invention furthermore describes the use of an embodiment of the device according to an aspect of the invention in a vehicle.

BRIEF DESCRIPTION OF THE DRAWINGS

Certain particularly advantageous configurations of aspects of the invention are indicated in the subclaims. Further preferred embodiments are also apparent from the following description of exemplary embodiments made with reference to figures, in which in schematic representation:

DETAILED DESCRIPTION OF THE PREFERRED EMBODIMENTS

Figure 1:
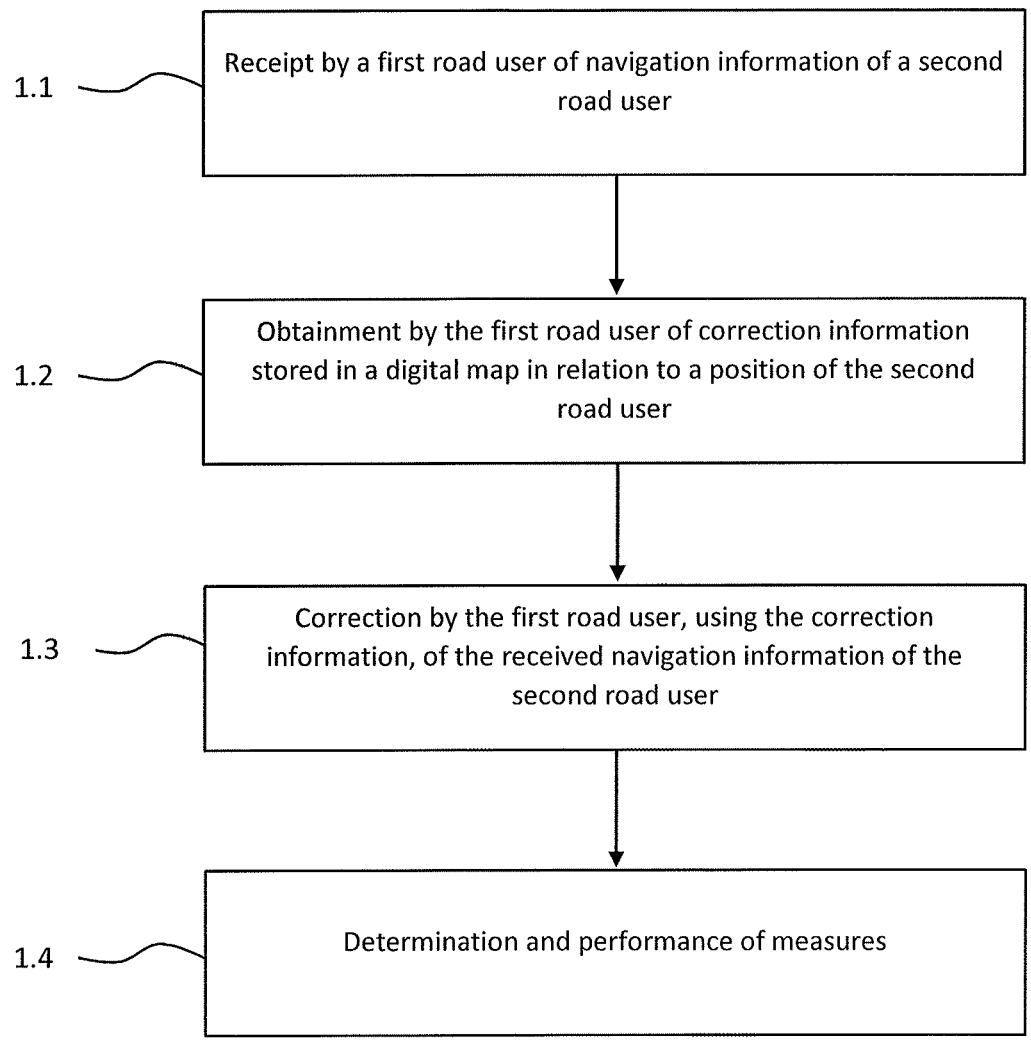
FIG. 1 shows an embodiment of the method according to an aspect of the invention.

FIG. 1 shows an exemplary embodiment of the method for determining navigation information of a second road user by a first road user, wherein, in a step 1.1, the first road user receives navigation information of the second road user which is in particular comprised by a vehicle-to-X message received by means of a communication device. In a step 1.2, the first road user obtains from a digital map correction information stored therein, which correction information corresponds to the position of the second road user determined on the basis of the navigation information. Then, in a step 1.3, using the correction information, the first road user corrects the received navigation information of the second road user. According to the example, this corrected or accuracy-enhanced navigation information can be used in a step 1.4 for determining and performing necessary measures for avoiding safety-critical traffic situations. To this end, transmission to further systems, for example driver assistance systems of a vehicle, of the first road user can conveniently be provided.

Figure 2:
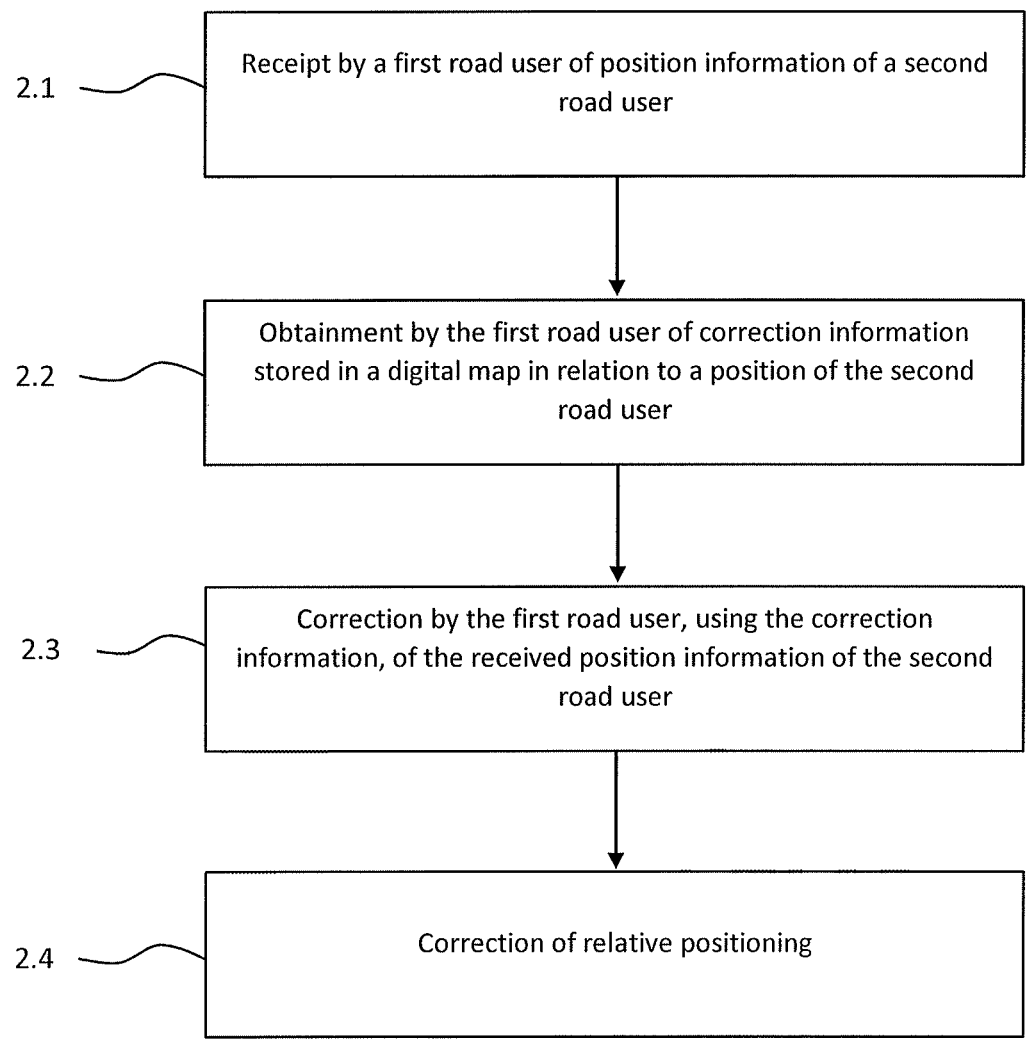
FIG. 2 shows a further embodiment of the method according to an aspect of the invention and FIG. 3 shows an exemplary embodiment of the device according to an aspect of the invention.

FIG. 2 shows a further exemplary embodiment of the method for determining position information for describing the position of a second road user by a first road user, wherein, in a step 2.1, the first road user receives position information of the second road user which is in particular comprised by a vehicle-to-X message received by means of a communication device. In a step 2.2, the first road user obtains from a digital map correction information stored therein, which correction information corresponds to the position of the second road user determined on the basis of the position information. Then, in a step 2.3, using the correction information, the first road user corrects the received position information of the second road user. According to the example, this corrected or accuracy-enhanced position information can be used in a step 2.4 for determining corrected or accuracy-enhanced relative positioning of the second road user in relation to the first road user. In this manner, acquisition of safety-critical traffic situations can in particular be improved and any corresponding necessary measures can be initiated. To this end, transmission to further systems, for example driver assistance systems of a vehicle, of the first road user can conveniently be provided.

Figure 3:
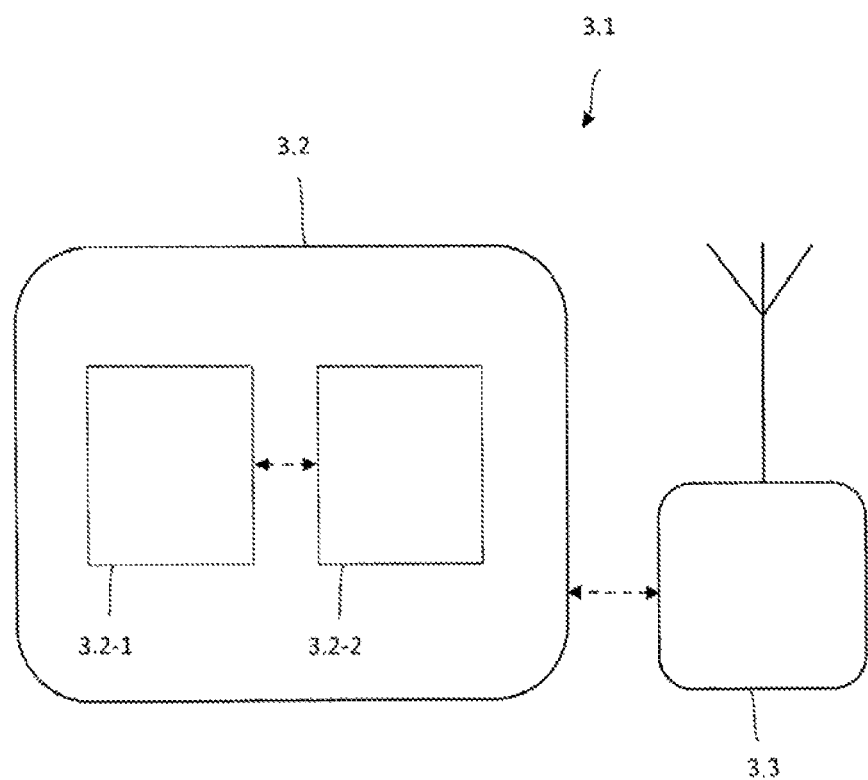

FIG. 3 shows an exemplary embodiment of a device 3.1 of a first road user according to an aspect of the invention which is designed to determine navigation information of a second road user. The device 3.1 comprises a computing unit 3.2, comprising processor 3.2-1 and memory 3.2-2, and a vehicle-to-X communication device 3.3 with an antenna. The computing unit 3.2 is here designed to correct, by means of processor 3.2-1 and using correction information, navigation information received from the second road user by means of the vehicle-to-X communication device 3.3 and to obtain the correction information corresponding to a position of the second road user from a digital map in memory 3.2-2.

If, over the course of the procedure, it transpires that a feature or a group of features is not absolutely necessary, then the applicant already requests now a wording of at least one independent claim in which the feature or group of features is no longer included. This can for example be a sub-combination of a claim present at the filing date or a sub-combination limited by further features of a claim present at the filing date. Such claims or combinations of features which are to be reworded should be understood also to be covered by the disclosure of this application.

It should also be pointed out that configurations, features and variants of aspects of the invention, which are described in the various embodiments or exemplary embodiments and/or shown in the figures, are combinable as desired. Individual or multiple features are interchangeable as desired. Resultant combinations of features should be understood also to be covered by the disclosure of this application.

Back-references in dependent claims should not be understood to amount to renouncing independent objective protection for the features of the back-referenced subclaims. These features can also be combined as desired with other features.

Features which are only disclosed in the description or features which are disclosed in the description or in a claim only in conjunction with other features can in principle independently have significance which is essential to aspects of the invention. They can therefore also be included individually in claims for the purpose of differentiation from the prior art.

In general, it should be noted that vehicle-to-X communication is in particular taken to mean direct communication between vehicles and/or between vehicles and infrastructure units. For example, it can thus be vehicle-to-vehicle communication or vehicle-to-infrastructure communication. If, in the context of this application, reference is made to communication between vehicles, this can in principle take place for example in the context of vehicle-to-vehicle communication, which typically takes place without mediation by a mobile radio network or a similar external infrastructure, and which can therefore be distinguished from other solutions which are based, for example, on a mobile radio network. For example, vehicle-to-X communication can take place on the basis of standards IEEE 802.11p or IEEE 1609.4. Vehicle-to-X communication can also be described as C2X communication or V2X communication. The sub-categories can be described as C2C (car-to-car) and V2V (vehicle-to-vehicle) or C2I (car-to-infrastructure) and V2I (vehicle-to-infrastructure). However, aspects of the invention explicitly do not rule out vehicle-to-X communication with mediation for example via a mobile radio network.

The invention claimed is:

1. A method for determining navigation information of a second road user using a computing unit of a first road user, comprising:
   receiving, by the first road user, navigation information of the second road user,
   obtaining a correction information corresponding to a position of the second road user from a digital map, the correction information previously computed by the first road user or a third road user,
   wherein the correction information describes a deviation between:
      navigation information obtained by a GNSS receiver of the first road user or the third road user when the first road user or the third road user were previously located at the position, and
      accuracy-enhanced navigation information based on sensor information captured by a sensor of the first road user or the third road user when the first road user or the third road user were previously located at the position, and
   correcting, by the computing unit of the first road user, the received navigation information of the second road user using the correction information.

2. The method according to claim 1, wherein the correction information is obtained by the computing unit of the first road user from a data memory carried by the first road user.

3. The method according to claim 1, wherein the correction information is stored by the computing unit of the first road user.

4. A method for determining navigation information of a second road user using a computing unit of a first road user, comprising:
   receiving, by the first road user, navigation information of the second road user,
   obtaining a correction information corresponding to a position of the second road user from a digital map, the correction information previously computed by the first road user or a third road user,
   wherein the correction information describes a deviation between:

navigation information obtained by a GNSS receiver of the first road user or the third road user when the first road user or the third road user were previously located at the position, and accuracy-enhanced navigation information based on dead reckoning data of the first road user or the third road user obtained when the first road user or the third road user were previously located at the position, and correcting, by the computing unit of the first road user, the received navigation information of the second road user using the correction information.

5. The method according to claim 1, wherein the correction information describes a deviation between:
   a position, speed, rotation, trajectory and/or variance metric determined by the GNSS receiver and the sensor information, and
   a position, speed, rotation, trajectory and/or variance metric determined by the GNSS receiver without the sensor information.

6. The method according to claim 1, wherein the correction information reproduces a variance metric of navigation information acquired by the GNSS receiver and navigation information based on dead reckoning.

7. The method according to claim 1, wherein the correction information reproduces a variance metric of navigation information acquired by a single frequency of the GNSS receiver.

8. The method according to claim 1, wherein the first road user only obtains correction information from the digital map which the first road user added to the digital map.

9. The method according to claim 1, wherein correction information is only added to the digital map by the first road user.

10. The method according to claim 1, wherein the first road user determines, by the computing unit, the calculation quality of the received navigation information.

11. The method according to claim 10, wherein the received navigation information is only corrected using the correction information when the determined calculation quality is less than or equal to a set limit value.

12. The method according to claim 1, wherein a position of the second road user received by vehicle-to-X communication is corrected using the correction information and a relative position of the second road user in relation to the first road user is identified.

13. A device of a first road user for determining navigation information of a second road user, comprising:
   a computing unit; and
   a vehicle-to-X communication device configured to receive navigation information of the second road user,
   wherein the computing unit is designed to:
     obtain a correction information corresponding to a position of the second road user from a digital map, the correction information previously computed by the first road user or a third road user,
     wherein the correction information describes a deviation between:
       navigation information obtained by a GNSS receiver of the first road user or the third road user when the first road user or the third road user were previously located at the position, and
       accuracy-enhanced navigation information based on sensor information captured by a sensor of the first road user or the third road user when the first road user or the third road user were previously located at the position, and
     correct the navigation information received from the second road user by the vehicle-to-X communication device using correction information.

\* \* \* \* \*